US006364087B1

(12) United States Patent
Abraham

(10) Patent No.: US 6,364,087 B1
(45) Date of Patent: Apr. 2, 2002

(54) ADAPTIVE STRING DETECTOR FOR CURRENCY VALIDATORS

(75) Inventor: Claude Abraham, Stow, OH (US)

(73) Assignee: Ardac, Incorporated, Eastlake, OH (US)

( * ) Notice: Subject to any disclaimer, the term of this patent is extended or adjusted under 35 U.S.C. 154(b) by 0 days.

(21) Appl. No.: 09/049,480

(22) Filed: Mar. 27, 1998

(51) Int. Cl.[7] .............................. G07F 3/00; G06K 7/00

(52) U.S. Cl. ....................................... 194/203; 194/207

(58) Field of Search ................................ 194/203, 207; 250/341.1, 341.5

(56) References Cited

U.S. PATENT DOCUMENTS 4,085,326 A * 4/1978 Williams ................. 250/341.5
5,383,546 A * 1/1995 Mulder ....................... 194/203
5,547,061 A * 8/1996 Itako et al. ................. 194/207
5,806,649 A * 9/1998 Walsh et al. ................ 194/203

* cited by examiner

*Primary Examiner*—Robert P. Olszewski
*Assistant Examiner*—Bryan Jaketic
(74) *Attorney, Agent, or Firm*—Renner, Kenner, Greive, Bobak, Taylor & Weber

(57) ABSTRACT

An adaptable string detector for currency validators has an infrared emitting diode on one side of the note path and an infrared phototransistor on the other. The phototransistor is connected to a window comparator and to an EEPOT. The EEPOT establishes a quiescent value for the output of the phototransistor to lie within the window of the window comparator. If a string or other retrieving implement is attached to a piece of currency traveling along the note path, the output of the phototransistor falls outside of the window, signaling that the note is to be rejected and no goods, services, or change is exchanged therefor.

15 Claims, 1 Drawing Sheet

ADAPTIVE STRING DETECTOR FOR CURRENCY VALIDATORS

TECHNICAL FIELD

The invention herein resides in the art of currency validators or note acceptors, and particularly to such devices known as slot acceptors. Specifically, the invention relates to a detector for determining the presence of foreign objects such as a retrieving string or the like within the note path of the note acceptor following the time that the end of the note has cleared the validator sensors in the note path.

BACKGROUND OF INVENTION

The use of currency validators or note acceptors for purposes of authenticating currency and providing goods, services or change in return therefor is extensively known. Prominent among the note acceptors are those termed as "slot" acceptors, having a slot opening in the housing of the note acceptor for receiving tendered currency. The slot communicates with a note path through which the currency is transported and tested for authenticity. At the end of the note path, the currency is either returned by reversal of the transport system in the event that the currency is determined to be invalid, or the currency is escrowed for subsequent vending and acceptance, in the event it is authenticated.

Those who would seek to defeat slot acceptors have devised various methods for retrieving the currency from the escrowed position. In this manner, the vended goods, services and/or change is enjoyed, while the tendered currency is maintained by the unscrupulous individual. Common among such attempts of retrieval is the implementation of strings or tape secured at one end to the currency and maintained at the other by the individual. Once the bill has been validated and passed to escrow, and a "vend" signal has been emitted by the validator, the currency is then retrieved by means of the string or tape.

In the past, various methods have been employed for defeating such stringing techniques. Among these known devices are rotating slotted drums, sharp tooth gates, rear clear pawls, and the like. While these prior art techniques have been generally successful, they inherently disable the note acceptor upon implementation and thereby place the note acceptor in a "down" state until service personnel access the equipment, remove the tape or string, and clear the system for reactivation.

While optical sensors of sorts have been considered in the past, they have typically been incapable of monitoring the presence of fine material such as cellophane tape, thread, and monofilament string such as fishing line and the like. Moreover, optical systems which have previously been considered have not been of an adaptive nature, but have been given to adverse effects of aging, thermal drift, and the like.

There is a need in the art for a highly sensitive adaptive string detector for use in currency validators which is constantly adjusted to maintain a high degree of resolution and accuracy and which is capable of optically detecting otherwise undetectable retrieving means such as those mentioned above.

DISCLOSURE OF INVENTION

In light of the foregoing, it is a first aspect of the invention to provide an adaptable string detector for currency validators having a sensitivity which is continually adjusted to compensate for any effects of aging, thermal drift, and the like.

Another aspect of the invention is the provision of an adjustable string detector for currency validators which provides for a fixed optical window of acceptability across the note path.

Yet a further aspect of the invention is the provision of an adaptable string detector for currency validators which can defeat stringing efforts without disabling the validator itself.

Yet a further aspect of the invention is the provision of an adaptable string detector for currency validators which is electronic in nature, not given to problems incident to mechanical structures employed for the same purpose.

Still a further aspect of the invention is the provision of an adaptable string detector for currency validators which is conducive to implementation with state of the art slot detectors employing microprocessor controls.

The foregoing and other aspects of the invention which will become apparent as the detailed description proceeds are achieved by an antistringing control system for currency validators, comprising: a note path having an opening for receiving inserted notes; a light source on a first side of said note path adjacent to said opening; a light detector on a second side of said note path adjacent to said opening, said light detector being positioned to receive light from said light source traversing said note path and emitting a first signal corresponding to the amount of light so received; and a comparator receiving said first signal and emitting a second signal indicative of any presence of a foreign element within said note path and between said light source and light detector.

Other aspects of the invention are attained by a method for determining the presence of any foreign material in the note path of a currency validator, following a determination of the validity of a note tendered in the path, comprising: casting a light across the note path; sensing the amount of light traversing the note path from that cast across the note path; generating a signal corresponding to said amount of light sensed; and comparing said signal to a first threshold indicative of the absence of foreign material within the note path; and ejecting the note from the note path upon said comparison of said signal with said first threshold indicating the presence of foreign material within the note path.

Still further aspects of the invention are attained by an antistringing control system for a currency validator, comprising: a note path; a light source and a light sensor juxtaposed on opposite sides of said note path, said light sensor generating a first signal corresponding to light received thereby from said light source; a window comparator connected to said light sensor and receiving said first signal, said window comparator having a characteristic window associated therewith and generating a second signal when said first signal falls outside of said window; and a controller connected to said window comparator and receiving said second signal, said control rejecting any note tendered to the currency validator upon receipt of said second signal.

BRIEF DESCRIPTION OF THE DRAWINGS

For a complete understanding of the objects, technique and structure of the invention reference should be made to the following detailed description and accompanying drawings wherein.

BEST MODE FOR CARRYING OUT THE INVENTION

Figure 1:
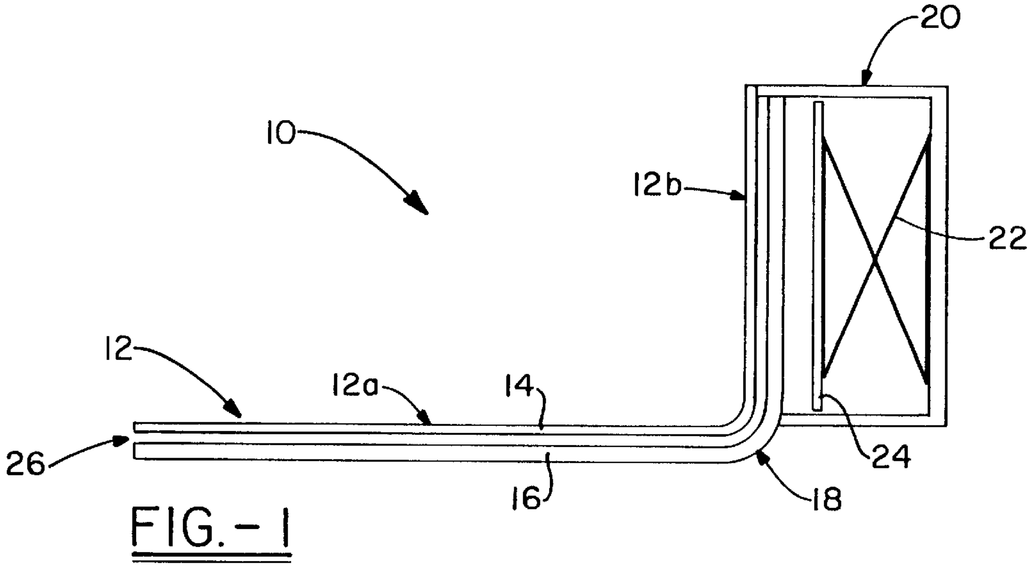
FIG. 1 is an illustrative rendering of a note path and cash box of a currency validator.

Referring now to the drawings and more particularly FIG. 1, it can be seen that a note path and cash box of a typical slot acceptor type of currency validator is designated generally by the numeral 10. A note path 12 is defined between the top plate 14 and a bottom plate 16, the note path 12 having a horizontal leg 12*a* and a vertical leg 12*b*. A right angle curve or bend 18 is provided at the transition between the horizontal leg 12*a* and vertical leg 12*b*, as shown.

Maintained in juxtaposition to the vertical leg 12*b* is a cash box 20 of somewhat standard nature, having a spring 22 biasing a plate 24 toward a pair of rails (not shown) on each side of an opening (not shown) maintained adjacent the vertical leg 12*b*. Those skilled in the art will understand that currency authenticated by the validator 10 is passed to the vertical leg 12*b* and "punched" into the cash box 20 where it is stacked with previously received bills and maintained between the plate 24 and rails by the urging of the spring 22.

As further shown in FIG. 1, a slot 26, typically in the form of an elongated opening in an escutcheon plate or the like, provides for entry of a note or currency into the horizontal leg 12*a*.

Figure 2:
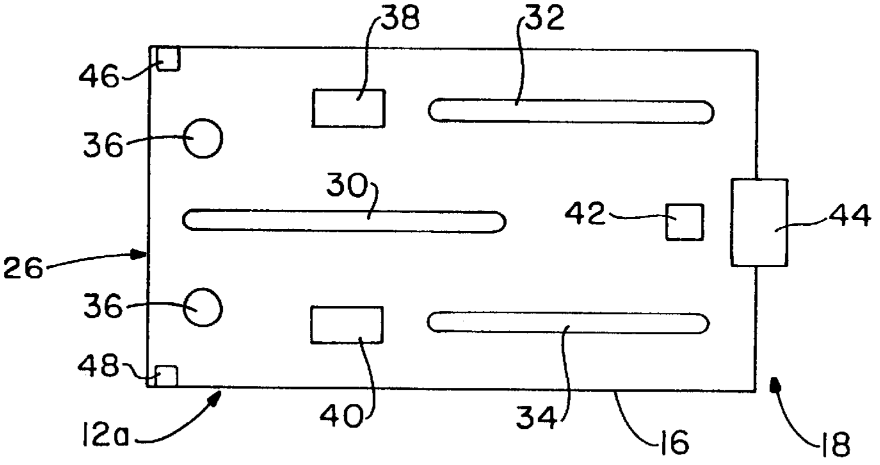
FIG. 2 is an illustrative top plan view of the horizontal leg of the note path illustrated in FIG. 1.

With reference now to FIG. 2, there is shown a top plan schematic view of the horizontal portion 12*a* of the note path 12. As will be readily appreciated by those skilled in the art, a plurality of transport belts 30, 32, 34 are maintained in slots provided within the bottom plate 16 for purposes of transporting or moving the currency along the horizontal leg 12*a* of the note path. It will be appreciated that the belts 30, 32, 34 are motor driven by interconnecting drive wheels, sprockets and the like. Similarly, transport belts are provided in association with the vertical leg 12*b* of the note path. Again, those skilled in the art will appreciate that the transport belts in the vertical portion are typically positioned on each side of the vertical leg and in juxtaposition to the rails of the cash box 20.

Those skilled in the art will appreciate that a pair of optical sensors 36 are provided at the front of the note path 12, just inside the slot 26. The optical sensors 36 are employed to sense the leading edge of a paper tendered as valid currency in order to actuate the motor for operating the transport system to convey the paper along the note path 12. Those skilled in the art will appreciate that the optical sensors 36 include both a light source and associated sensor. Also maintained along the horizontal leg 12*a* of the note path 12 are optical readers 38, 40 to test for the presence of various colors, patterns, and/or optical densities of the paper as it passes along the note path 12. A magnetic head sensor is also typically provided along the note path 12, and often near the bend 18. The magnetic head 42 typically senses and reads the magnetic ink characteristics of valid currency. At the end of the horizontal leg 12*a* and at the bend 18 is a rear clear switch 44, positioned to indicate that the end of the note has passed thereover and cleared the testing portion of the note path. Typically, the rear clear 44 will terminate operation of the drive motor in order to hold the currency in "escrow" until the vend operation is completed. It is at this point that most stringing operations occur, when an individual seeks to retrieve the bill once it has been authenticated and a vend signal has been issued by the validator.

Those skilled in the art will appreciate that the structure thus described is somewhat standard in the art. The implementation of transport systems, optical and magnetic testing means, and bill stackers are quite known in the art. The present invention contemplates the implementation of yet additional sensors and control mechanisms to determine the presence of any foreign material in the note path following the passage of the note to the escrow position. In that regard, and as shown in FIG. 2, a light source 46 is positioned on one side of the note path 12*a* and opposite a photodetector 48. In the preferred embodiment of the invention, the light source 46 is an infrared emitting diode and the photodetector 48 is a phototransistor. The photo source 46 and photodetector 48 are preferably positioned just inside the slot 26 and generally in line or coplanar with the optical sensors 36.

Figure 3:
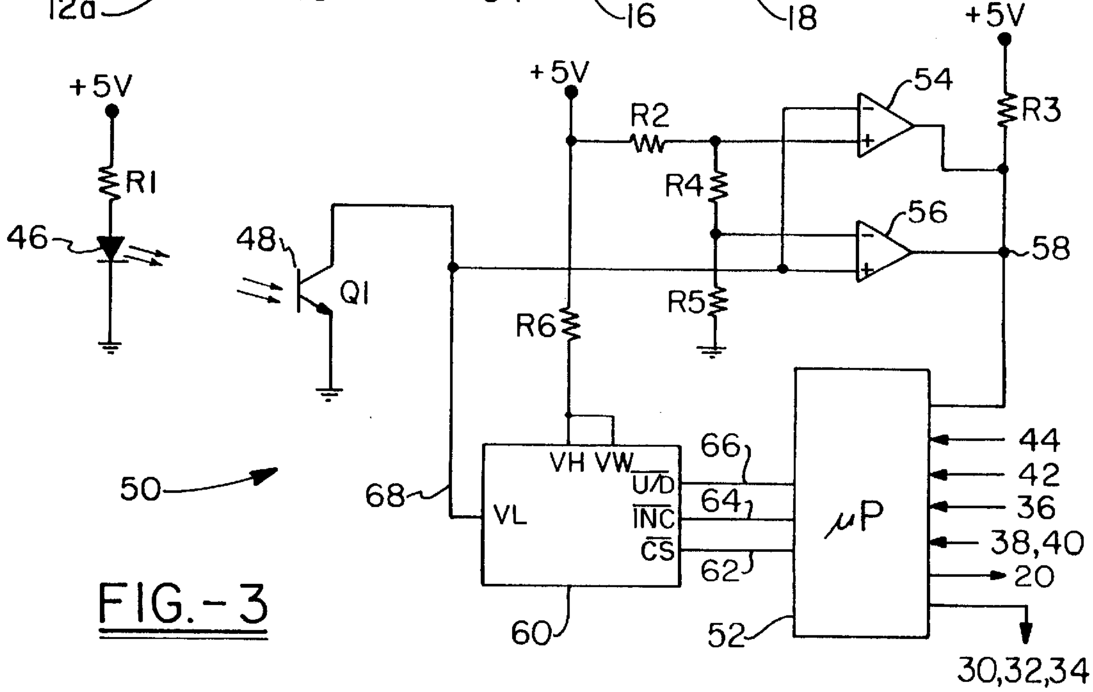
FIG. 3 is an electrical schematic diagram of the detection and control circuit of the invention.

As shown in FIG. 3, a note path monitoring circuit made in accordance with the invention is designated by the numeral 50. Included as a portion of the circuit 50 is a microprocessor 52 which serves to control the operation of the bill validator itself, and is adapted to receive a "note present" signal from the front sensors 36 and to then actuate the motor controlling the transport belts 30–34. The microprocessor controller 52 receives data from the optical readers 38, 40 and magnetic head 42 from which it determines the authenticity of the paper tendered as a piece of valid currency. If the paper is determined to be invalid, the motor and associated belts 30–34 are reversed and the paper is rejected along the horizontal leg 12*b* and out of the slot 26. If the paper is determined to be valid currency, it is transported past the rear clear switch 44, where it is held in escrow awaiting the vending operation. The operation just described is typical of many slot acceptors. The microprocessor 52, however, serves additional function in the instant invention.

With continued reference to FIG. 3, it can be seen that a pair of comparators 54, 56 are interconnected to establish a window comparator having a window defined by the voltage divider established by the values of resistors R2, R4 and R5. The output 58 of the window comparator 54, 56 is a wired "high true AND" junction so that when the outputs of both comparator 54, 56 are high, the output 58 is high. In the event that either is low, the output 58 is low. Accordingly, the output 58 is high only when the input to the negative input of the comparator 54 is below a first upper threshold and that same input to the positive input of the comparator 56 is above a second lower threshold, those thresholds being set by the voltage divider of R2, R4, R5. The input to the window comparator 54, 56 is the output of the phototransistor 48, established at the collector thereof.

An electrically erasable potentiometer (EEPOT) 60 is interconnected between the microprocessor 52 and the collector of the phototransistor 48. The EEPOT 60 is, as known in the art, an array of 99 series-connected resistors interconnected by JFET switches. These switches allow for interconnection of any of the 99 series-connected resistors and effectively serve as the wiper terminal of an electromechanical potentiometer. The JFET switch configuration is stored in an on-board EEPROM, making the setting non-volatile, such that repowering of the device maintains the last value of resistance. In the preferred embodiment of the invention, the EEPOT is 50 kilohm, such that each of the 99 series-connected resistors has a resistance of 505 ohms. The EEPOT 60 has a chip select input 62 which serves to enable the EEPOT 60. Another input 64 receives pulsed inputs, each pulse incrementing the resistance value of the EEPOT by one resistor value, and thereby effectively serving as the wiper control of the potentiometer. The input 68 determines whether the resistance value is incremented upwardly or decremented downwardly. The input voltage to the EEPOT

60 passes through the resistor R6 and through the resistance established by the inputs 64, 66 as just discussed. The resultant output 68 is passed to the collector of the phototransistor 48 and constitutes the positive input to the comparator 56 and the negative input to the comparator 54, as discussed above.

It will be appreciated that the infrared emitting diode 46 illuminates the note path 12 just inside the slot 26. The unfiltered phototransistor 48 become fully illuminated with the note path clear. With the emitter of the phototransistor 48 being permanently connected to ground and the collector connected to the EEPOT 60, the resistance connected to the collector establishes the gain in ohms. As a consequence, the product of the source of current and the collector resistance or gain is the voltage applied to the window comparator 54, 56.

When the bill validator 10 is first powered up, the microprocessor 52 executes a setup program. The chip select input 62 of the EEPOT 60 is enabled. The input 66 is actuated such that the resistance value decreases or decrements with each pulse on the input 64. Ninety-nine impulses are introduced to the input 64 to assure that the resistance value of the EEPOT 60 is at its lowest possible value. Accordingly, the collector voltage of the phototransistor 48 is at its highest value and above the upper threshold set for the comparator 54. Accordingly, the output 58 of the window comparator 54, 56 is low and is passed to the microprocessor 52. The input 66 is then toggled to increase or increment the value of the EEPOT 60 and the input 64 is pulsed once. The resistance of the EEPOT is then increased by the value of one resistor (505 ohms.) This increase in resistance produces a decrease in collector voltage at the phototransistor 48. If that new collector voltage now lies inside the window of the window comparator 54, 56, the output 58 goes high, indicating that the window has been entered. If the output does not go high, the input 64 of the EEPOT 60 is pulsed again, and repeatedly so until the output 58 goes high. Once the output 58 has gone high, the input 64 is continually pulsed until the output 58 goes low again. The number of pulses between the output 58 switching from high back to low indicates the width of the window. The input 66 of the EEPOT 60 is then switched to the down position and the input 64 is pulsed a number of times equal to one half of the number of pulses within the window. The quiescent level of the input to the window comparators 54, 56 is then at the center of the window.

It will be appreciated that this "centering" technique, or the technique of establishing the quiescent level of the phototransistor output within the center of the window is undertaken repeatedly, often many times a second, to be certain that the system is adaptive to the effects of aging, thermal drift, and the like. The EEPOT 60 and associated phototransistor 48 are thus preferably maintained at a point central to the window.

When a piece of currency is inserted into the slot 26, the output 58 goes low, since the currency blocks some of the light and causes the collector voltage to go outside of the window. However, the resistance of the EEPOT 60 remains constant since the chip select input 62 is held inactive by the microprocessor 52. In other words, upon sensing the presence of a note as by the sensors 36, the microprocessor 52 presents a voltage on the input 62 to inhibit the effects of the inputs 64, 66. After the paper clears the note path, as sensed by the rear clear switch 44, if the collector voltage of the transistor 48 falls within the window of the window comparators 54, 56, the output 58 goes high, indicating to the microprocessor 52 that there is no obstruction in the note path and that the vend can be processed and the note positioned for punching into the cash box 20. However, if the collector voltage of the phototransistor 48 falls outside the window, indicating the presence of a foreign object in the note path, the microprocessor 52 causes the motor associated with the belts 30, 32, 34 to reverse, passing the note rearwardly and out of the slot 26. In such event, no vend signal is produced.

It will be appreciated that the window associated with the window comparators 54, 56, can be made as narrow or as wide as desired by appropriate selection of the resistors of the voltage divider R2, R4, R5. Typically, the lower threshold of the window will be between 80–90% of the upper threshold. Additionally, it may be desired to position the quiescent value of the collector voltage of the phototransistor 48 other than at the center of the window, but possibly biased more toward the upper threshold of the comparator 54 or the lower threshold of the comparator 56. Such can be readily accomplished thus use of the EEPOT 60 and its inputs 64, 66.

It has been found that fibers as small as a human hair can be detected in the note path 12*b* by implementation of the system shown in FIG. 3. Indeed, the sensitivity thereof can be adjusted, as aforesaid, by appropriate termination of the voltage divider and adjustment of the EEPOT 60.

Thus it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. An antistringing control system for a currency validator, comprising:

a note path having an opening for receiving inserted notes;

a light source on a first side of said note path adjacent said opening;

a light detector on a second side of said note path adjacent said opening, said light detector being positioned to receive light from said light source traversing said note path and emitting a first signal corresponding to the amount of light so received; and a window comparator receiving said first signal and emitting a second signal indicative of any presence of a foreign element within said note path and between said light source and light detector.

2. The antistringing control system according to claim 1, further comprising a drive mechanism within said note path, said drive mechanism receiving said second signal and returning a note received within said note path back out of said opening when said second signal indicates the presence of a foreign material.

3. The antistringing control system according to claim 2, wherein said light detector comprises a phototransistor.

4. The antistringing control system according to claim 3, further comprising a potentiometer connected to said phototransistor, said potentiometer establishing a reference level for said first signal indicative of said note path being clear and unobstructed between said light source and light detector.

5. The antistringing control system according to claim 4, wherein said potentiometer is electronically incrementally selectable.

6. The antistringing control system according to claim 5, wherein said comparator has upper and lower thresholds, and said potentiometer sets said reference level for said first signal between said thresholds.

7. The antistringing control system according to claim 6, wherein said lower threshold is between 80% and 90% of said upper threshold.

8. A method for detecting the presence of any foreign material in the note path of a currency validator, following a determination of the invalidity of a note tendered within the note path, comprising:

casting a light across the note path;

sensing the amount of light traversing the note path from that cast across the note path;

generating a signal corresponding to said amount of light sensed;

comparing said signal with first and second thresholds indicative of the absence of foreign material within the note path; and ejecting the note from the note path upon said comparison of said signal with said first and second thresholds indicating the presence of foreign material within the note path.

9. The method according to claim 8, wherein said note is ejected from said note path upon said comparison of said signal with said first and second thresholds resulting in said signal falling outside said thresholds.

10. The method according to claim 9, wherein a quiescent value of said signal is periodically reset during times that a note is not within the note path.

11. The method according to claim 10, wherein said quiescent value of said signal is set between said first and second thresholds.

12. The method according to claim 11, wherein said quiescent value of said signal is set by incrementing a supply voltage to a phototransistor.

13. An antistringing control system for a currency validator, comprising:

a note path;

a light source and a light sensor juxtapositioned on opposite sides of said note path, said light sensor generating a first signal corresponding to light received thereby from said light source;

a window comparator connected to said light sensor and receiving said first signal, said window comparator having a characteristic window associated therewith and generating a second signal when said first signal falls outside of said window; and a controller connected to said window comparator and receiving said second signal, said controller rejecting any note tendered to the currency validator upon receipt of said second signal.

14. The antistringing control system according to claim 13, wherein said light sensor receives a control voltage establishing a quiescent level of said first signal in a center portion of said window.

15. The antistringing control system according to claim 13, further comprising a note drive mechanism, said controller actuating said note drive mechanism to reject said note upon receipt of said second signal.

* * * * *